United States Patent [19]

Mochida

[11] 4,310,086
[45] Jan. 12, 1982

[54] AUTOMATIC ADJUSTING DEVICE FOR A CLUTCH OPERATING MECHANISM

[75] Inventor: Haruo Mochida, Yokohama, Japan

[73] Assignee: Nissan Motor Company, Limited, Yokohama, Japan

[21] Appl. No.: 45,416

[22] Filed: Jun. 4, 1979

[30] Foreign Application Priority Data

Jun. 6, 1978 [JP] Japan .................... 53-67908

[51] Int. Cl.³ .................................. F16D 13/75
[52] U.S. Cl. ................................... 192/111 A
[58] Field of Search ............... 192/99 S, 111 A; 74/539, 542, 541

[56] References Cited

U.S. PATENT DOCUMENTS

| | | | |
|---|---|---|---|
| 3,199,367 | 8/1965 | Zetye | 192/99 S |
| 3,621,959 | 11/1971 | Gale | 192/111 A |
| 3,768,612 | 10/1973 | Gale | 192/111 A |
| 4,227,603 | 10/1980 | Fasano | 192/111 A |

FOREIGN PATENT DOCUMENTS 2352183  4/1975  Fed. Rep. of Germany .
1411467 10/1975  United Kingdom .

OTHER PUBLICATIONS

Hutte, vol. IIa, pp. 141–144.

Primary Examiner—Andrew V. Kundrat
Attorney, Agent, or Firm—Thompson, Birch, Gauthier & Samuels

[57] ABSTRACT

The present invention relates to an automatic adjusting device for a cable type clutch operating mechanism which automatically compensates for wear of the clutch facings by disengaging the cable from the clutch pedal upon a clutch pedal closely approaching and assuming a home position. Under these conditions, only a single relatively weak spring applies tension to the cable while a clutch return spring holds the pedal in the home position so that rattling of pedal is prevented and automatic adjustment for clutch facing wear is possible without excessive stress being applied to a release bearing of the clutch.

3 Claims, 4 Drawing Figures

AUTOMATIC ADJUSTING DEVICE FOR A CLUTCH OPERATING MECHANISM

FIELD OF THE INVENTION

The present invention relates to an automotive vehicle and more specifically to an automatic adjusting device for a clutch operating mechanism of the vehicle.

BRIEF DESCRIPTION OF THE DRAWINGS

The objects, features and advantages of the present invention will become more apparent as the description of the prior art arrangements and the embodiments of the present invention are made in conjunction with the accompanying drawings in which.

DESCRIPTION OF THE PRIOR ART

Figure 1:
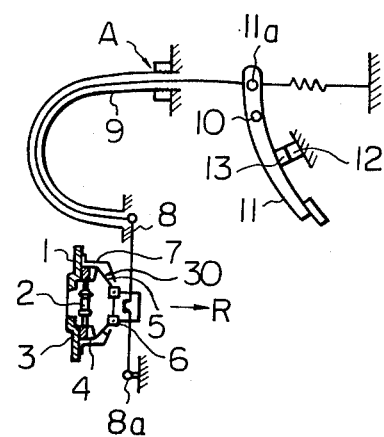
FIG. 1 is a schematic representation of a first prior art arrangement showing the operative connection between a clutch pedal and a clutch mechanism per se.

Referring to FIG. 1 of the drawings, there is shown a well known prior art cable type clutch operating mechanism with a flywheel 1 and a clutch disc 2 which can engage clutch facings 3 carried on the fly wheel 1. The clutch further includes a pressure plate 4 which urges the clutch disc 2 toward the flywheel 1 under the bias of a diaphragm spring 5. The diaphragm spring 5 is arranged to deflect about a wire ring 30 which acts as a fulcrum. The inner peripheral portion of the diaphragm spring 5 is in constant contact with a clutch release bearing 6 which is arranged to be axially displaceable. The numeral 7 denotes a clutch housing or case. A withdrawal lever 8 has one end rotatably supported at 8a and the other end is connected via a cable 9 to an upper portion 11a of a clutch pedal 11. The clutch pedal 11 is pivotally mounted on a pivot pin or rotatable shaft 10. The clutch pedal 11 is further formed with a stop 13 at one side edge thereof which is arranged to come into abutment with a stop 12 formed on or connected to the vehicle body (indicated by hatched areas) upon release or non-depression of the pedal.

With the above described arrangement the diaphragm spring 5 is in contact with the release bearing 6 as can be appreciated from FIG. 1 (It is to be noted that it is common in other type clutches to provide 1 to 2 mm of play between the diaphragm spring and the release bearing. Thus, the diaphragm spring 5 urges the release bearing in a direction R away from the clutch facings 3. The biasing force of the diaphragm spring 5 is also transferred to the clutch pedal 11 through the withdrawal lever 8 and the cable 9.

Thus, upon wearing of the clutch facings 3 the force applied to the clutch facings decreases as the abutment between the stops 12 and 13 prevents counterclockwise rotation of the pedal 11 beyond the illustrated position, despite the fact that the release bearing 6 should move in the direction of the arrow R as a result of this wear. Thus, the clutch is allowed to assume an engagement condition which is similar to that which would normally occur upon the clutch pedal 11 being depressed by a slight amount. Hence, due to decrease in urging force applied by the diaphragm spring 5 on the clutch facings 3 the durability of the clutch release bearing 6 decreases along with a reduction in clutch capacity and resultant slippage of same.

In order to overcome the just mentioned problems, it is a conventional practice to effect adjustment via manipulation of an adjustment unit A which includes a length adjust screw attached to the cable 9.

This adjustment is rather difficult and in actual practice can be performed satisfactorily by only a skilled operator.

Therefore, the above described arrangement has suffered from the drawback that, upon wearing of the clutch facings 3 the vehicle must be taken to a garage for adjustment by a mechanic.

In order to overcome the drawback encountered by the prior art shown in FIG. 1, it has been proposed in Japanese Utility Model Application No. 48-44499 to employ an arrangement for automatically adjusting the length of the cable 9. This arrangement, shown schematically in FIG. 2, includes a lever 14 which is rotatably or pivotally mounted on the pivot pin 10 of the clutch pedal 11. The same numerals used in connection with FIG. 1 are used in FIG. 2 as well as FIGS. 3 and 4 for simplicity. A stopper lever 15 is pivotally mounted on the clutch pedal 11 via a rotatable pivot shaft 18 which is fixedly connected to the pedal 11 and which passes through the pedal 11 at approximately the mid point thereof. A pawl 19 is fixedly connected to the pivot shaft 18 for synchronous movement with said stopper lever 15. The lever 14 is formed with a ratchet having a plurality of ratchet teeth 17 adapted for engagement with the pawl 19. A spring 16 is wound around the pivot pin 10 and arranged to interconnect the clutch pedal 11 and the stopper lever 15 in a manner that the stopper lever is biased to rotate in a clockwise direction with respect to the clutch pedal 11 so as to in turn move the pawl 19 into meshing engagement with the ratchet teeth 17.

A relatively weak spring 20 is arranged to interconnect the vehicle body (no numeral) with the top of the lever 14 at a point close to or identical with the point at which a connecting link 9a establishes connection between the cable 9 and the lever 14.

With the arrangement shown in FIG. 2, if the release bearing 6 is displaced in a direction away from the clutch facings 3 as a result of wear, this displacement is transferred to the withdrawal lever 8 and subsequently to the lever 14 via the cable 9 to induce the lever 14 to rotate in a counterclockwise direction as shown in the figure. This counterclockwise rotation of the lever 14 will, because of the meshing engagement between the pawl 19 and the ratchet teeth 17, cause the clutch pedal 11 to rotate in a counterclockwise direction and the stopper lever 15 to approach and contact the stop 12. When the force causing the rotation of the lever 14 overcomes the bias of the spring 16, the stopper lever 15 and the pawl 19 will rotate counterclockwise with respect to the clutch lever 11 to bring the pawl 19 out of contact with the teeth 17 thus allowing the lever 14 to rotate under the influence of the bias from the withdrawal lever 8 against the bias of the spring 20 until an equibrium is established therebetween. This movement allows the clutch facings 3 to once again contact in the appropriate manner via the temporary release of the lever 14. As will be appreciated, as soon as this movement is completed, the pawl 19 reengages with the ratchet teeth 17 to lock the clutch pedal to the lever 14.

This arrangement, while surpassing the arrangement of FIG. 1, has suffered from the drawback that the cable 9 is subject to load buildup from the value established immediately after cable adjustment to the predetermined level at which the pawl 19 will be brought out of contact with the ratchet teeth 17. Hence, this load will be applied to the release bearing 6 after amplification via the lever ratio of the withdrawal lever 8 against the release bearing 6 and the lever ratio of the diaphragm spring 5, thus tending to the reduce the life of the release bearing. Further, vibration of the clutch is apt to be transferred to the vehicle body and the clutch pedal 11 via the cable 9.

In order to prevent the above mentioned rattling during running of the vehicle, it is necessary for the spring 16 have a relatively high spring modulus, whereby the predetermined value at which the pawl 19 will disengage from the ratchet is undesirably raised. Thus, a vicious wear cycle is created which reduces the life of the release bearing 6 at an undesirably high rate.

A further prior art arrangements known at the time of the development of the present invention include clutches of the type described in Japanese Patent Applications No. 52-23128 and No. 52-23129 wherein a clearance is provided between the release bearing and the withdrawal lever irrespective of the amount of wear of the clutch facings. These clutches are different from the type of clutch toward which the present invention is directed.

Prior art clutches with clearance between the release bearing and the withdrawal lever suffer from the drawback that as the wear of the facings increases, the stroke of the clutch pedal accordingly increases and eventually becomes excessive even though the clutch continues to function properly. This is because the stroke of the pedal is a function of withdrawal lever ratio and clutch pedal ratio. In order to overcome this disproportionate increase in clutch stroke a mechanism is provided for adjusting the length of the outer casing of the cable. However this measure requires an unduly large space for installation and requires that the cable be carefully spaced from other parts so as to avoid interference therewith.

SUMMARY OF THE PRESENT INVENTION

Figure 2:
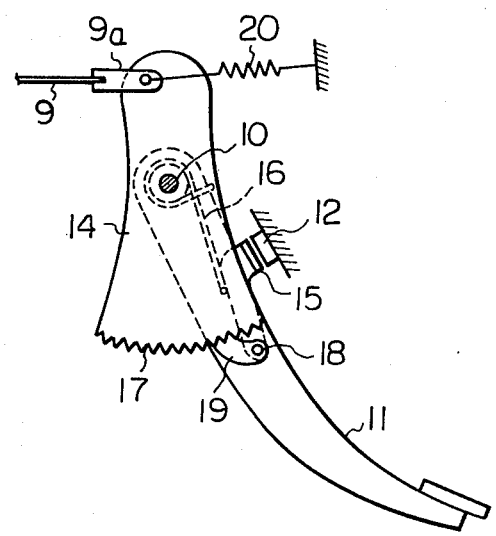
FIG. 2 is a schematic side elevation of a prior art automatic adjusting mechanism for compensating for wearing of the clutch facings.

The present invention has been proposed in order to overcome the drawbacks suffered by the prior art clutch mechanism and especially the type disclosed in connection with FIGS. 1 and 2. In brief, a pawl and ratchet or the equivalent are arranged to automatically disengage upon the clutch being released and assuming its home or rest position. In this way the tension which builds in the prior art clutch mechanisms is eliminated since the cable leading from the clutch is, under this condition, tensioned only by a single spring attached to the vehicle body.

More specifically, the invention which is used in a vehicle having a body includes an automatic adjusting device for a clutch operating mechanism of a cable actuated clutch of the type in which a diaphragm spring is in constant contact with a release bearing and a withdrawal lever is operatively connected to the release bearing and a cable is connected at one end of the withdrawal lever, said automatic adjusting device comprising:

a first lever pivotally mounted on a pivot that is stationary with respect to the vehicle body, one end of the first lever being operatively connected to the other end of the cable;

a clutch pedal pivotally mounted on the pivot;

a return spring for biasing the clutch pedal to rotate in a first rotational direction with respect to the vehicle body and toward a home position;

a stopper lever pivotally mounted to the clutch pedal, the stopper lever having a stopper portion adapted to be sandwiched between said clutch pedal and the vehicle body when the clutch pedal assumes the home position;

a spring having a spring modulus lower than the spring modulus of the return spring for biasing the stopper lever to rotate in a second rotational direction with respect to the vehicle body; and means associated with said stopper lever the the first lever for interconnecting the stopper lever and the first lever and locking the first lever to the clutch pedal upon the clutch pedal being moved a predetermined amount from the home position.

DETAILED DESCRIPTION OF THE PREFERRED EMBODIMENTS

Figure 3:
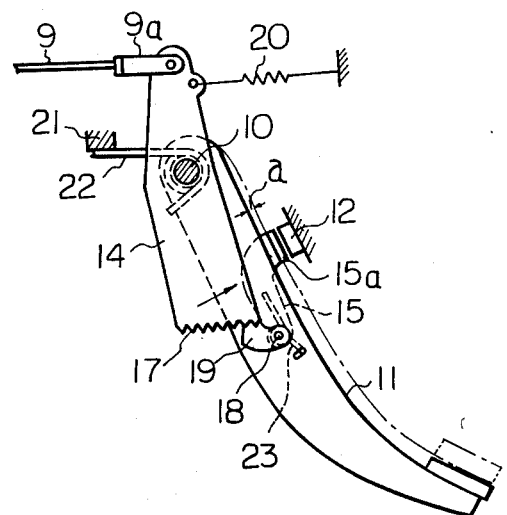
FIG. 3 is a schematic side elevation of a first embodiment of the present invention.

Referring now to FIG. 3, there is shown a first embodiment of the present invention. While at first glance, the arrangement in FIG. 3 bears a remarkable resemblence to the arrangement of FIG. 2, it will become clear that there is a notable difference between the two arrangements.

As previously indicated, like numerals denote the same components as in the previously described arrangements in FIGS. 1 and 2.

In this embodiment, the clutch pedal 11 is biased to rotate in a counterclockwise direction by a spring 22 in the form of a return spring which acts to move the pedal to a home or rest position when released. As shown, one end of the return spring 22 end acts on the leading edge of the clutch pedal 11. In this case stopper lever 15 is subject to the bias of a spring 23 which has a low spring modulus as compared to the spring modulus of the spring 16 of the prior art shown in FIG. 2 and the return spring 22 of the present embodiment.

At this time, it should be noted that the clutch pedal 11 is shown partially depressed from the home or rest position which is indicated in phantom.

Under this condition, the spring 23 acts on the stopper lever 15 to move it to the illustrated position wherein the pawl 19 is engaged with the ratchet teeth 17. Thus, the lever 14 and the clutch pedal 11 are locked together and depression of the pedal will draw the cable 9 in a direction to separate the clutch facings 3.

Upon release, the clutch pedal 11 it will return to its home position. However, as will be seen from FIG. 3, there is a predetermined clearance a between the edge of the clutch pedal 11 and a stopper portion 15a formed on the free end of the stopper lever 15. Thus on the return stroke, the stopper portion 15a will contact the stop 12 and the stopper lever 15 will move toward and into abutment with the edge of the clutch pedal 11. This movement is sufficient to move the pawl 19 (which moves in unison with the stopper lever 15) out of engagement with the ratchet teeth 17 thereby freeing the lever 14 whenever the clutch pedal assumes its home position. As will be appreciated from the drawings, under the just mentioned condition, the cable 9 will be subject to tensioning by the spring 20 only. Therefore, while the clutch is in the home or rest position a constant tension, which is markedly lower than in the case of the FIG. 2 arrangement, will prevail in the cable 9. Simultaneously, the lever 14 is free to move and assume a new angular position with respect to the clutch pedal 11 in response to the wear of the clutch facings 3. This of course enables the automatic adjustment for wear. While the lever 14 and the clutch pedal 11 are "unlocked," the release bearing 6 is subject to very little stress and its useful life is prolonged.

Upon depression of the clutch pedal 11 to disengage the clutch, the pedal will initially move through a distance which allows the stopper lever 15 to project from the clutch pedal to reestablish the clearance a whereupon the pawl 19 will engage with the ratchet teeth 17. The position at which the pawl engages the ratchet will of course vary with the amount of wear of the clutch facings 3.

Once the pawl 19 engages the ratchet teeth 17, the lever 14 and the clutch pedal 11 will be locked together and move in unison thereafter. The cable 9 will be accordingly drawn to rotate the clutch withdrawal lever 8 and separate the clutch facings 3.

Figure 4:
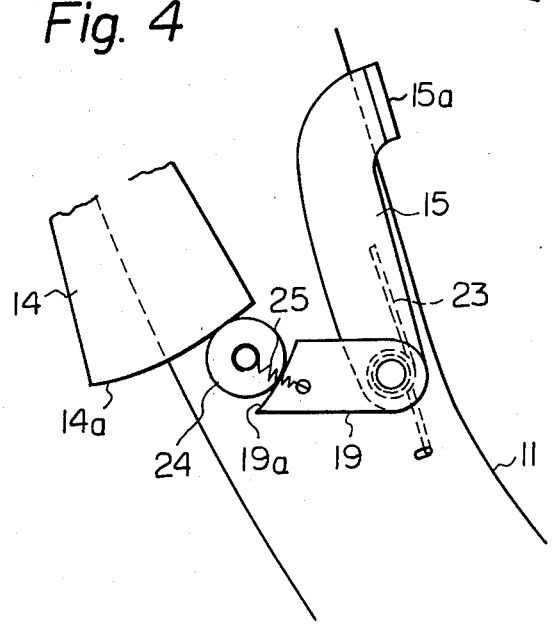
FIG. 4 is a schematic partial side elevation of a second embodiment of the present invention.

The first embodiment shown in FIG. 3 enables the adjustment of the wear of the facings in discrete increments due to the provision of the stepped arrangement of the ratchet and pawl mechanism. FIG. 4 on the other hand shows a second embodiment of the present invention which enables continuous or non-stepwise adjustment of the clutch facing wear. This arrangement utilizes a roller 24 interposed between a curved convex surface 14a formed at the free end of the lever 14 at a position corresponding to the position of the ratchet of the first embodiment and a concave curved surface 19a formed on the free end of the pawl 19. The roller 24 is connected to the pawl member via a spring 25.

Thus, upon depression of the clutch pedal 11 the pawl 19 will rotate in a clockwise direction as the stopper lever 15 is permitted to move the stopper portion 15a away from the edge of the clutch pedal and wedge the roller 24 between the two curved surfaces 14a and 19a. Thereafter, the operation is the same as the first embodiment.

It will be appreciated that the spring 25 permits both rotation and displacement of the roller 24 so that, when the clutch pedal 15 assumes the home position, the lever 14 is once more free to assume a new position which compensates for the wear of the clutch facings 3.

Experiments show that in each of the above described embodiments, the magnitude of the return force applied by the return spring 22 on the clutch pedal 11 was about 1 Kg. measured at the clutch pad of the clutch pedal and about 3 to 5 Kg. measured at the stopper position and thus falling within the preferred range of clutch pedal manipulation.

Thus, in summary, the present invention provides an arrangement whereby automatic adjustment of the wear of the clutch facings can be achieved while avoiding the excessive tension which can occur with the prior art arrangements. This extensive tension reduces the wear rate of the release bearing by maintaining a constant low tension in the cable 9 while the clutch pedal is released and prevents rattling of the clutch pedal during running of the vehicle via the provision of the independent clutch return spring.

What is claimed is:

1. An automatic adjusting device for a cable actuated clutch used in a vehicle, said cable actuated clutch being of the type in which a diaphragm spring is in constant contact with a release bearing, with a withdrawal lever operatively connected to said release bearing, and with one end of a cable connected to said withdrawal lever, said device comprising:

a first lever pivotally mounted on a pivot that is stationary with respect to a body of said vehicle, one end of said first lever being operatively connected to the other end of said cable;

a clutch pedal pivotally mounted on said pivot for movement toward and away from a home position;

a first spring for biasing said clutch pedal to rotate in a first direction toward said home position;

a stopper lever pivotally mounted on said clutch pedal, said stopper lever having a stopper portion adapted to be sandwiched between said clutch pedal and said vehicle body when said clutch pedal is at said home position;

a second spring having a spring modulus lower than the spring modulus of said first spring for biasing said stopper lever to rotate in a second direction; and first means associated with said stopper lever and said first lever for interconnecting said stopper lever and said first lever and for locking said first lever to said clutch pedal when said clutch pedal is moved a predetermined amount from said home position, said first means including a first curved surface formed at the other end of said first lever, a pawl member formed with a second curved surface at a free end thereof, said pawl member being connected to said stopper lever for synchronous rotation therewith, and a roller configured to roll along said first and second curved surfaces, said roller being wedged between said surfaces when said clutch pedal is moved by said predetermined amount.

2. The automatic adjusting device as claimed in claim 1 further comprising a third spring interconnecting said one end of said first lever and said vehicle body for maintaining a predetermined low tension in said cable while said clutch pedal is at said home position.

3. An automatic adjusting device for a cable actuated clutch used in a vehicle, said cable actuated clutch being of the type in which a diaphragm spring is in constant contact with a release bearing, with a withdrawal lever operatively connected to said release bearing, and with one end of a cable connected to said withdrawal lever, said device comprising:

a first member pivotally mounted on pivot means, one end of said first member formed with a first curved surface, the other end of said first member operatively connected to the other end of said cable;

a clutch pedal pivotally mounted on said pivot means for movement toward and away from a home position;

a first spring for biasing said clutch pedal for rotational movement toward said home position;

a stopper lever pivotally mounted on said clutch pedal, said stopper lever having a stopper portion disposed between said clutch pedal and a body of said vehicle when said clutch pedal is at said home position;

a second spring for biasing said stopper lever for rotational movement with respect to said vehicle body, said second spring having a spring modulus which is lower than the spring modulus of said second spring;

a second member connected to said stopper lever for synchronous rotation therewith, said second member formed with a second curved surface; and a roller configured to roll on said first and second curved surfaces and to be wedged between said curved surfaces when said clutch pedal is moved a predetermined amount for locking said first lever to said clutch pedal.

* * * * *